United States Patent
West et al.

(10) Patent No.: US 9,428,903 B2
(45) Date of Patent: Aug. 30, 2016

(54) FLASHING SYSTEM FOR MOUNTING PHOTOVOLTAIC ARRAYS ONTO TILE ROOFS

(71) Applicant: SolarCity Corporation, San Mateo, CA (US)

(72) Inventors: Jack Raymond West, San Rafael, CA (US); Emil Johansen, San Rafael, CA (US); David Molina, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/486,165

(22) Filed: Sep. 15, 2014

(65) Prior Publication Data

US 2015/0075100 A1   Mar. 19, 2015

Related U.S. Application Data

(60) Provisional application No. 61/877,672, filed on Sep. 13, 2013.

(51) Int. Cl.
*E04B 1/66* (2006.01)
*E04D 13/04* (2006.01)
*E04C 2/30* (2006.01)
*E04D 13/147* (2006.01)

(52) U.S. Cl.
CPC ............... *E04B 1/665* (2013.01); *E04C 2/30* (2013.01); *E04D 13/0404* (2013.01); *E04D 13/147* (2013.01)

(58) Field of Classification Search
CPC ..... E04B 1/665; E04C 2/30; E04D 13/0404; E04D 13/147
See application file for complete search history.

(56) References Cited

U.S. PATENT DOCUMENTS

| | | | | |
|---|---|---|---|---|
| 270,337 A | * | 1/1883 | Rendle | 52/308 |
| 673,229 A | * | 4/1901 | Windle | 52/460 |
| 4,741,132 A | * | 5/1988 | Emblin | 52/58 |
| 5,337,526 A | * | 8/1994 | Hartman | 52/58 |
| 5,457,924 A | * | 10/1995 | Fujii et al. | 52/396.1 |
| 8,671,630 B2 | * | 3/2014 | Lena et al. | 52/173.3 |
| 8,756,881 B2 | * | 6/2014 | West et al. | 52/173.3 |
| 2006/0000178 A1 | * | 1/2006 | Almy | 52/543 |
| 2006/0266405 A1 | * | 11/2006 | Lenox | 136/244 |
| 2011/0314753 A1 | * | 12/2011 | Farmer et al. | 52/173.3 |
| 2012/0152326 A1 | * | 6/2012 | West et al. | 136/251 |
| 2012/0266946 A1 | * | 10/2012 | West et al. | 136/251 |
| 2013/0133270 A1 | * | 5/2013 | West et al. | 52/58 |
| 2014/0158184 A1 | * | 6/2014 | West et al. | 136/251 |
| 2014/0175244 A1 | * | 6/2014 | West et al. | 248/316.7 |
| 2015/0155823 A1 | * | 6/2015 | West et al. | 248/316.7 |
| 2015/0200618 A9 | * | 7/2015 | West et al. | 136/251 |

FOREIGN PATENT DOCUMENTS

WO   WO 2015039007 A3 * 5/2015

OTHER PUBLICATIONS

Written Opinion for PCT/US2014/055594 dated Feb. 4, 2015 (6 pages).*

* cited by examiner

*Primary Examiner* — Rodney Mintz
(74) *Attorney, Agent, or Firm* — Larry D. Johnson

(57) ABSTRACT

A tile hook and flashing assembly, having: (a) a lower flashing; (b) an upper flashing; (c) a tile hook; and (d) a seal, wherein tile hook extends through an aperture passing between overlapping portions of the upper and lower flashings, and wherein the seal extends across the aperture and seals around the tile hook.

11 Claims, 12 Drawing Sheets

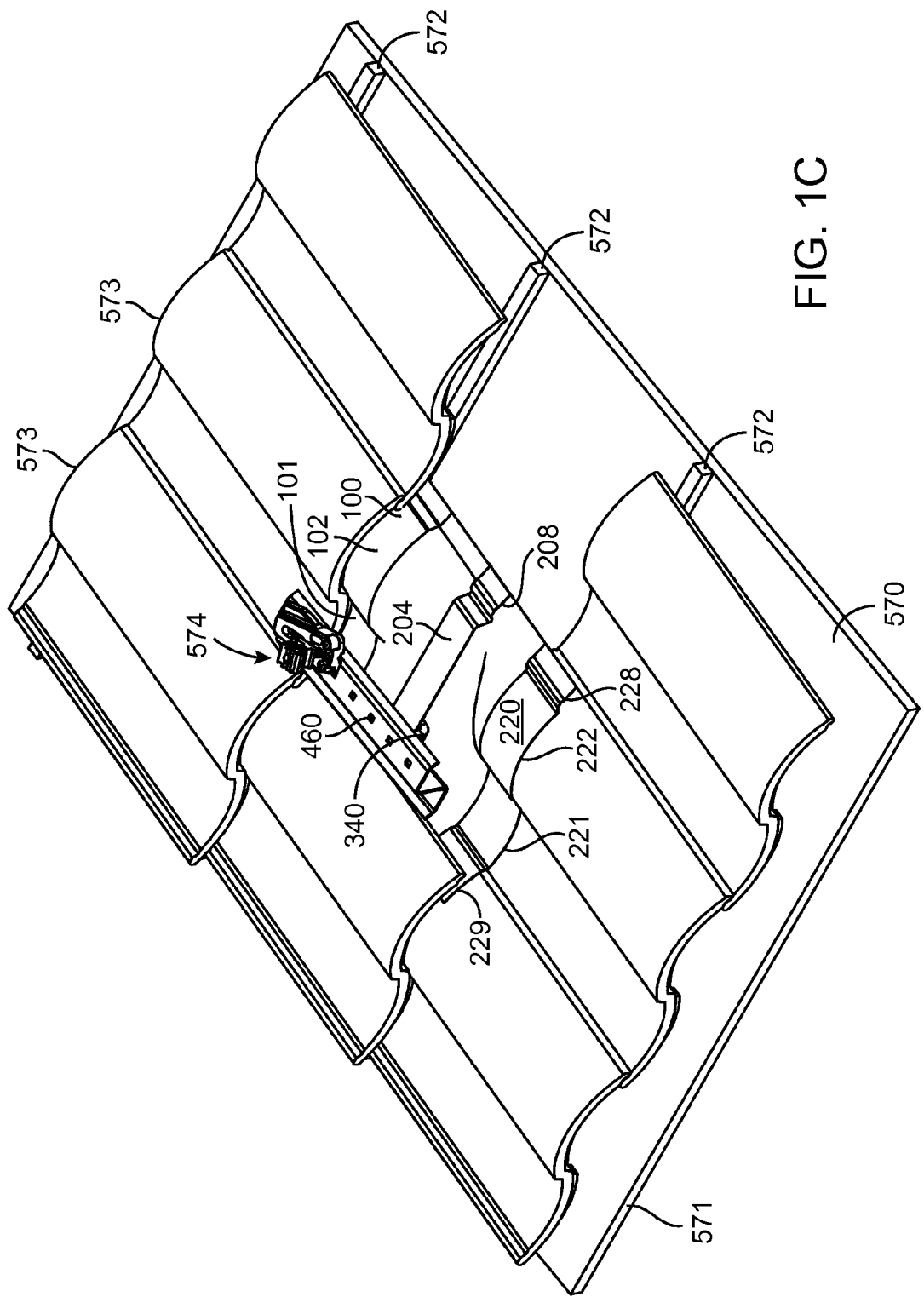

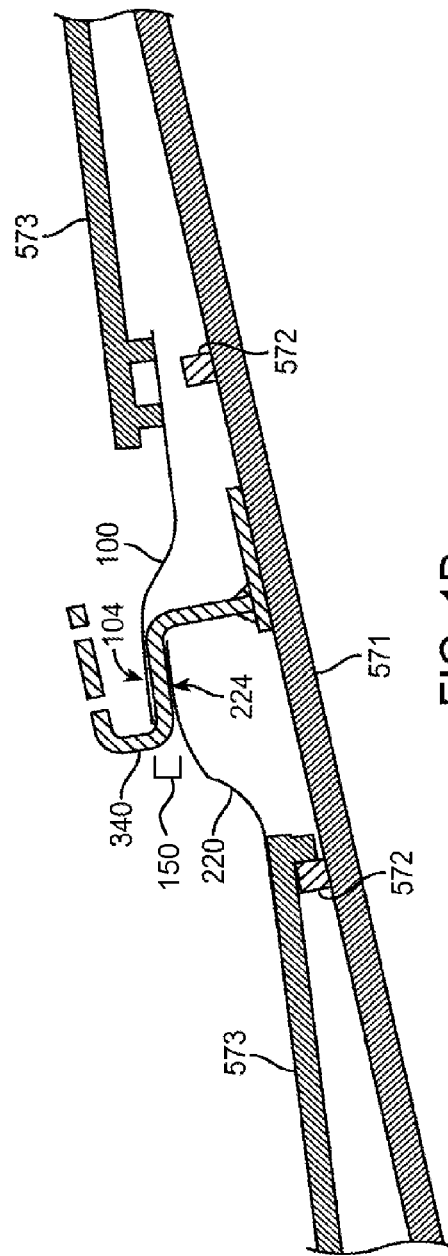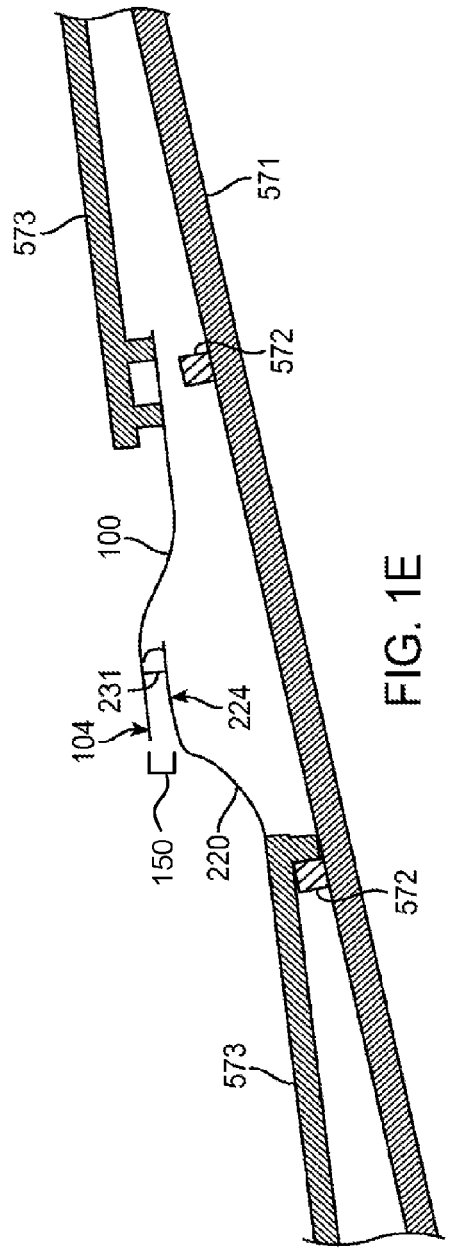

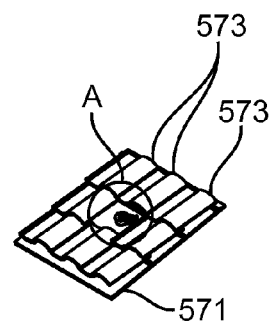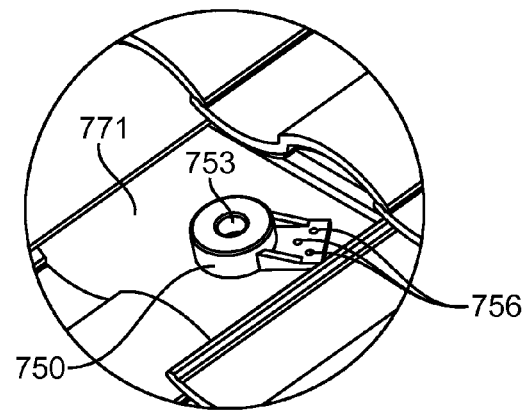
FIG. 9A  FIG. 9A-1
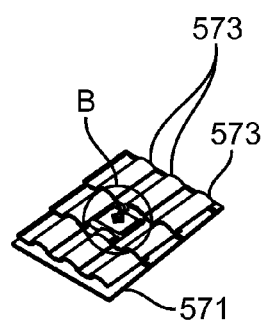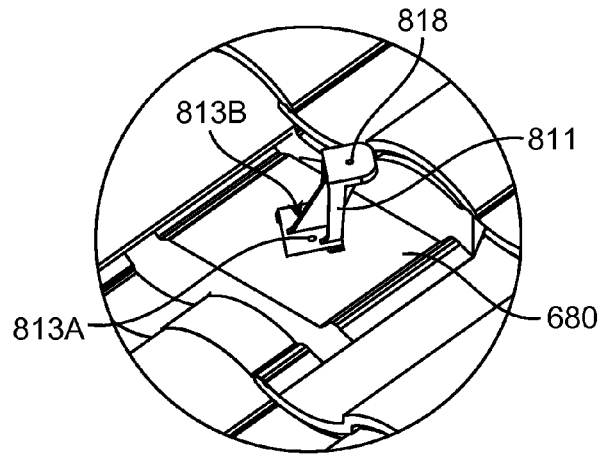
FIG. 9B  FIG. 9B-1
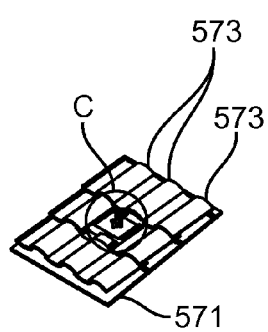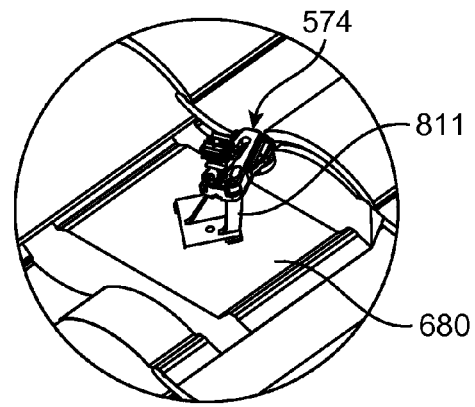
FIG. 9C  FIG. 9C-1

US 9,428,903 B2

FLASHING SYSTEM FOR MOUNTING PHOTOVOLTAIC ARRAYS ONTO TILE ROOFS

RELATED APPLICATION

The present invention claims priority to U.S. Provisional Patent Application Ser. No. 61/877,672, entitled Attachment Components For Photovoltaic Arrays, filed Sep. 13, 2013.

BACKGROUND OF THE INVENTION

Mounting photovoltaic arrays onto tile roofs presents unique challenges. First, some tiles need to be removed so that photovoltaic system mounting hardware can be attached to the rafters in the roof below. A common approach has been to remove several tiles and then attach tile hooks to the roof rafters at these locations. The area where the tiles have been removed from the roof then needs to be sealed to prevent water intrusion. Finally, the photovoltaic array is then mounted onto the tile hooks (or onto hardware mounted onto these tile hooks).

A common concern with existing tile hook approaches has been preventing water leakage into the building after the rafter connections have been made. What is required to solve this problem is a flashing system that transports water around the fasteners without permitting the water to enter into the roof through the fastener holes.

Unfortunately, these flashing problems are more complex when working with Spanish tiles (a.k.a.: "S tile") roofs. For example, standard flashings are simply not shaped for use with Spanish S-tile roofs. What is instead desired is a flashing system that is shaped for use with curved S-shaped tile roofs, yet also seals around the tile hook connection to the roof such that rain water is prevented from entering into the roofing membrane at the tile hook connection point. Ideally, such a system would also provide some adjustability such that mounting hardware and brackets could be positioned at desired locations regardless of the exact location of the building rafters. Moreover, such a system would ideally provide a water-tight seal using resilient (i.e.: not brittle) materials. As will be shown below, the present invention provides such a system.

SUMMARY OF THE INVENTION

The present invention provides a tile hook and flashing assembly, comprising: (a) a lower flashing; (b) an upper flashing; and (c) a tile hook, wherein a portion of the tile hook extends through an aperture passing between overlapping edges of the upper and lower flashings. A seal is provided within the aperture between the overlapping edges of the upper and lower flashings. This seal preferably extends upwardly from the overlapping edge of the lower flashing and pushes against the bottom of the overlapping edge of the upper flashing. As such, the seal pushes against the bottom portion of the tile hook that extends through the aperture. Thus, the aperture is sealed, with the seal in effect wrapping around an underside portion of the tile hook that passes through the aperture. Alternate approaches are also contemplated for the seal, all keeping within the scope of the present invention. For example, the seal may instead extend downwardly from the upper flashing or both upwardly from the lower flashing and downwardly from the upper flashing.

An advantage of the present system is that it provides a watertight seal around the curved neck of the portion of the tile hook that snakes between the overlapping edges of the upper and lower flashings. Additionally, the present seal is easy to install. For example, simply placing the upper flange down on top of the lower flange will cause the seal to form around the tile hook. Thus, the present system is quick and easy to install and requires no additional non-standard hardware to install.

In an alternate embodiment, the present invention provides a continuous flashing assembly, comprising: (a) a flashing plate having a flattened center section and two opposite curved end sections, wherein the two opposite curved end sections are dimensioned to mate with S-shaped building tiles; (b) a puck positioned below the flattened center section of the continuous flashing plate; and (c) an arm on top of the flattened center section of the flashing plate, wherein the arm is connected to the puck with a connector that passes through the flattened center section of the flashing plate. The advantage of this system is that it permits a wide range of locations where the arm and puck can be installed on the roof. As such, it provides multiple locations from which the array mounting hardware can be positioned.

BRIEF DESCRIPTION OF THE DRAWINGS

FIG. 1C is a view similar to FIG. 1B, but adding more of the surrounding roofing tiles, and roof structure.

FIG. 1D is a side elevation view taken along line 1D-1D in FIG. 1B.

FIG. 1E is a side elevation view taken along line 1E-1E in FIG. 1B.

FIGS. 9A to 9C show sequential steps in the assembly of the embodiment of the invention shown in FIGS. 6 to 8B.

FIG. 9A-1 is a close-up view of the circled region in FIG. 9A.

FIG. 9B-1 is a close-up view of the circled region in FIG. 9B.

FIG. 9C-1 is a close-up view of the circled region in FIG. 9C.

DETAILED DESCRIPTION OF THE DRAWINGS

Figure 1A:
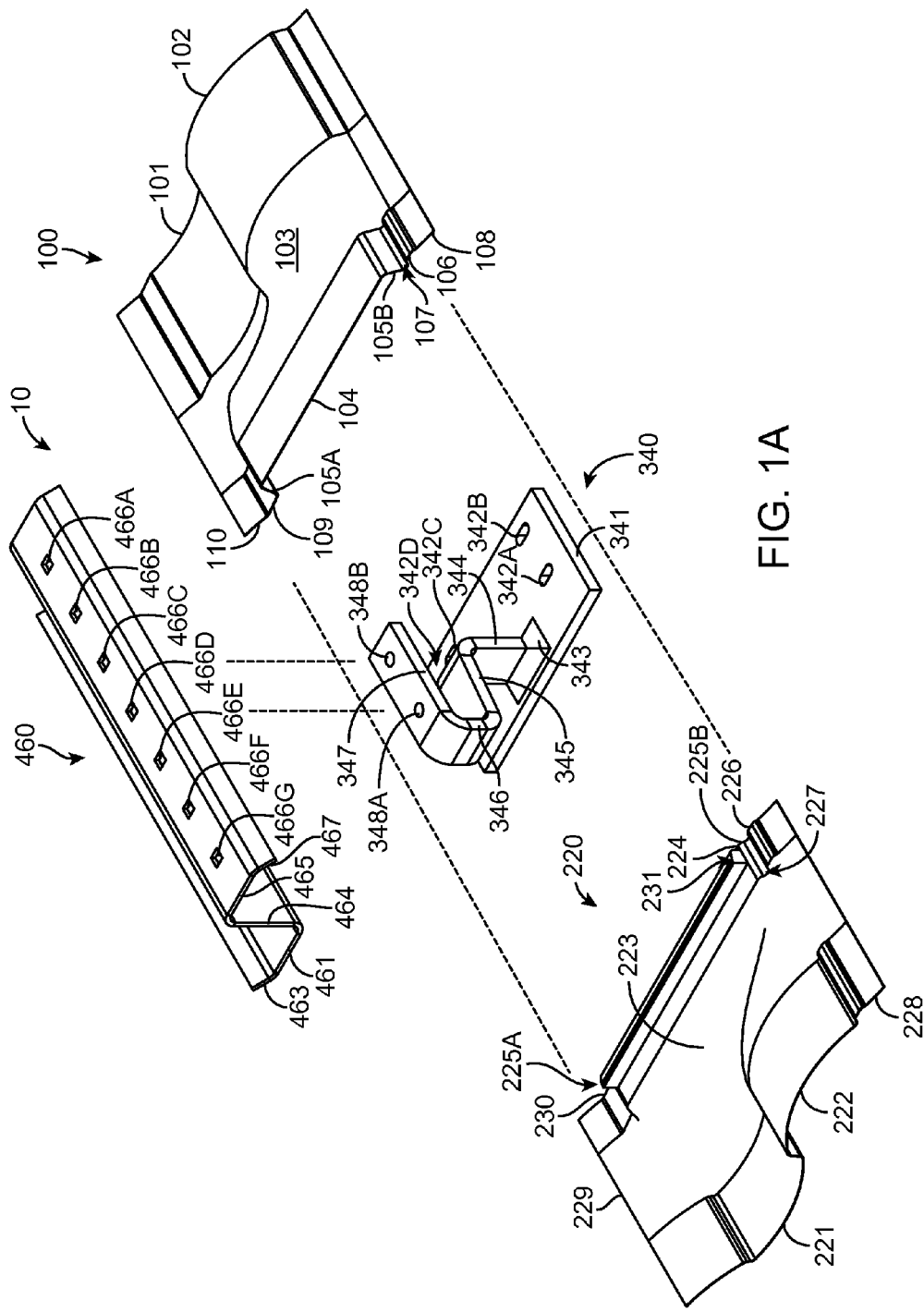
FIG. 1A is an exploded perspective view of the present tile hook and flashing assembly.
Figure 1B:
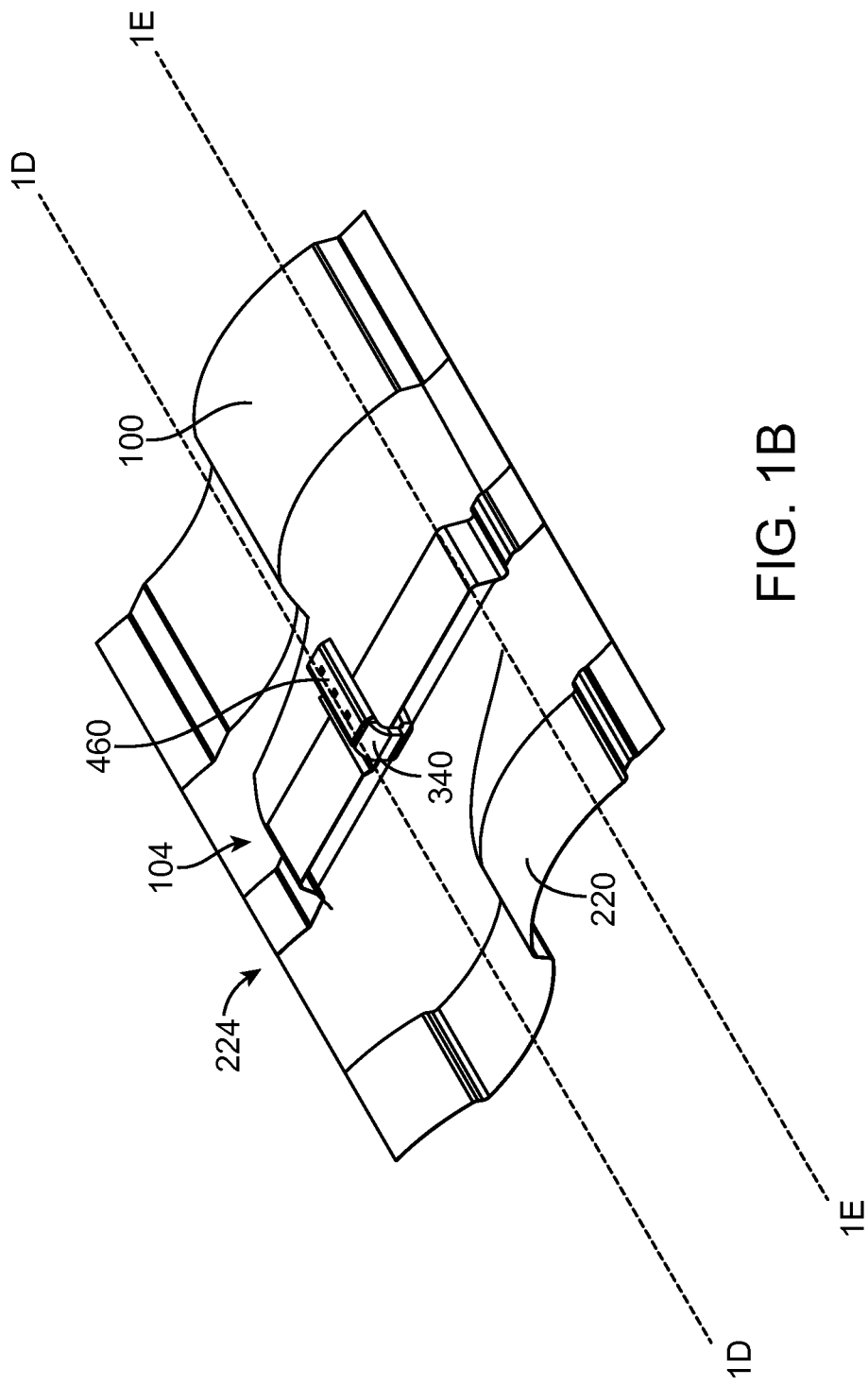
FIG. 1B is an assembled perspective view corresponding to FIG. 1A.

FIGS. 1A to 1C illustrate the present tile hook and flashing assembly. FIGS. 1D and 1E provides further sectional views of the assembly. As seen in these Figs., an assembly 10 is provided. Assembly 10 comprises an upper flashing 100, a lower flashing 220, a tile hook 340, and a top arm 460.

In operation, overlapping edges 104 and 224 of flashings 100 and 220 are received above and below the center portion of the tile hook 340 such that tile hook 340 extends (or "snakes") through an aperture passing therebetween. As will be explained, a seal is formed between the upper and lower flashings and this seal wraps partially around the portion of the tile hook that passes through the aperture. FIG. 1A shows an exploded view and FIG. 1B shows an assembled view of assembly 10. Together, flashings 100 and 220 prevent water from entering into the space where the bottom of the tile hook is connected to the roof. Upper flashing 110 is placed up-roof of lower flashing 220. As will be explained, the curved upper edge of upper flashing 100 is adapted to mate with the up-roof S-shaped tiles, while the curved lower edge of lower flashing 220 is adapted to mate with the down-roof S-shaped tiles.

FIG. 1C is similar to FIG. 1B, but also shows surrounding roofing tiles and roofing structures. Specifically, roof 570 includes substrate 571, battens 572, and tiles 573. After one or more tiles have been removed, tile hook 340 is then affixed to substrate 571 by installing screws or other fasteners. Tile hook may be installed in the center of the gap where the tiles have been removed, or it may be installed on either side of the center. Once lower flashing 220 has been installed, then upper flashing 100 can be positioned with overlapping edge portion 104 covering overlapping edge portion 224. As will be shown, a seal is formed between overlapping edge portions 104 and 224. Lower flashing 220's convex portion 221 and concave portions 228 are dimensioned to rest atop corresponding portions of down-roof tile 573. Similarly, upper flashing 100's concave portion 101 and convex portion 102 are received beneath corresponding up-roof tile 573.

FIGS. 1D and 1E are side elevation views taken along lines 1D-1D and 1E-1E in FIG. 1B. FIG. 1D shows the portion of the tile hook that snakes between the overlapping edges of the upper flashing 100 and lower flashing 220. FIG. 1E is a view slightly offset from FIG. 1D, showing the seal 231 between the upper and lower flashings. As will be shown, seal 231 may extend upwardly from lower flashing 220 and push against the bottom of the portion of tile hook 340 that snakes through the aperture 150 between the overlapping portions of the two flashings. Further details of seal 231 are explained and illustrated below.

Figure 2:
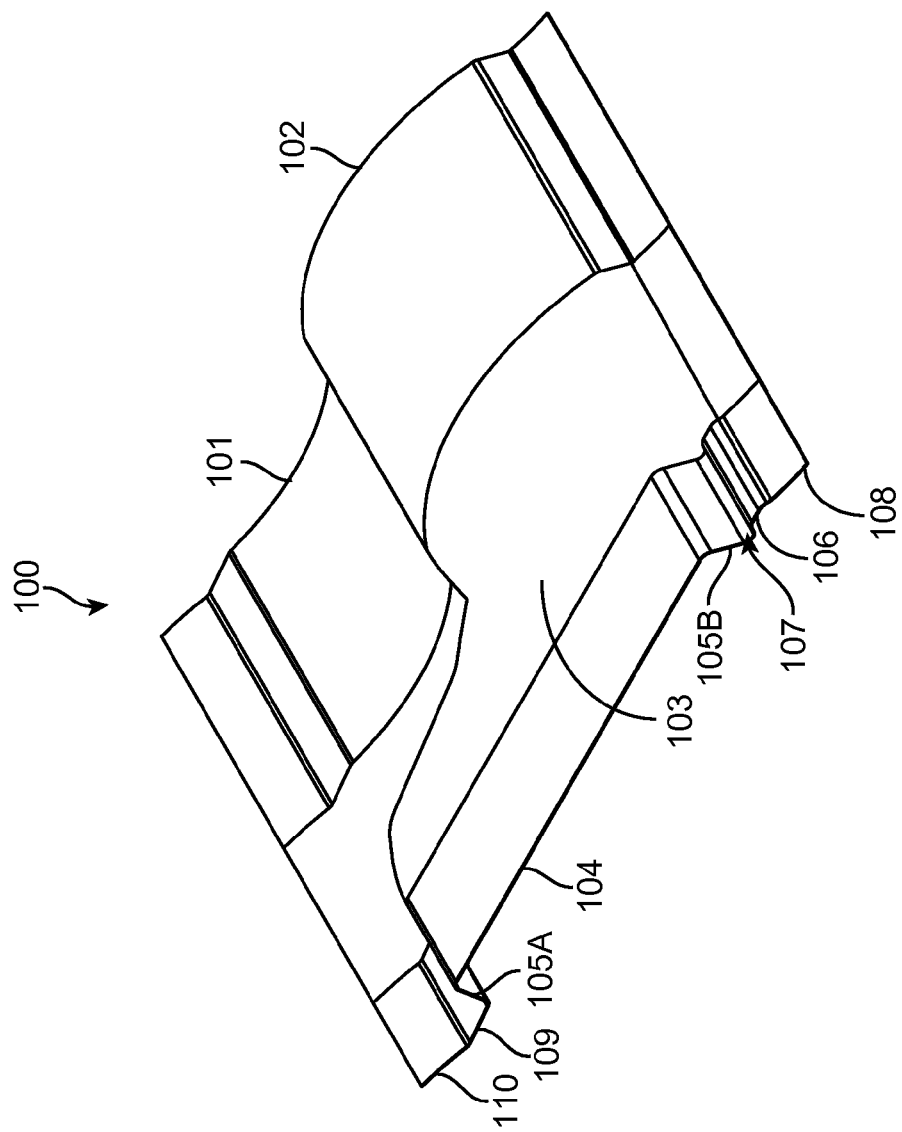
FIG. 2 is a perspective view of the upper flashing.

FIG. 2 is a perspective view of upper flashing 100. At one end, upper flashing 100 comprises a convex portion 101 and a concave portion 102. Together, portions 101 and 102 form an S-shaped first edge. At the opposite edge, an overlapping portion 104 is found. Overlapping portion 104 may optionally have two side walls 105A and 105B, a rise 106 that partially defines trough 107 and a flange 108. Overlapping portion 104 may further include a downward panel 109 and an upward panel 110. A transition portion 103 sits mid-way between the opposite edges. Transition portion 103 may rise, fall or slope to accommodate the dimensions of both edges of the flashing. Upper flashing 100 may be made of aluminum, steel, or other metals or other materials. It may be formed, molded, cast or otherwise formed.

Figure 3:
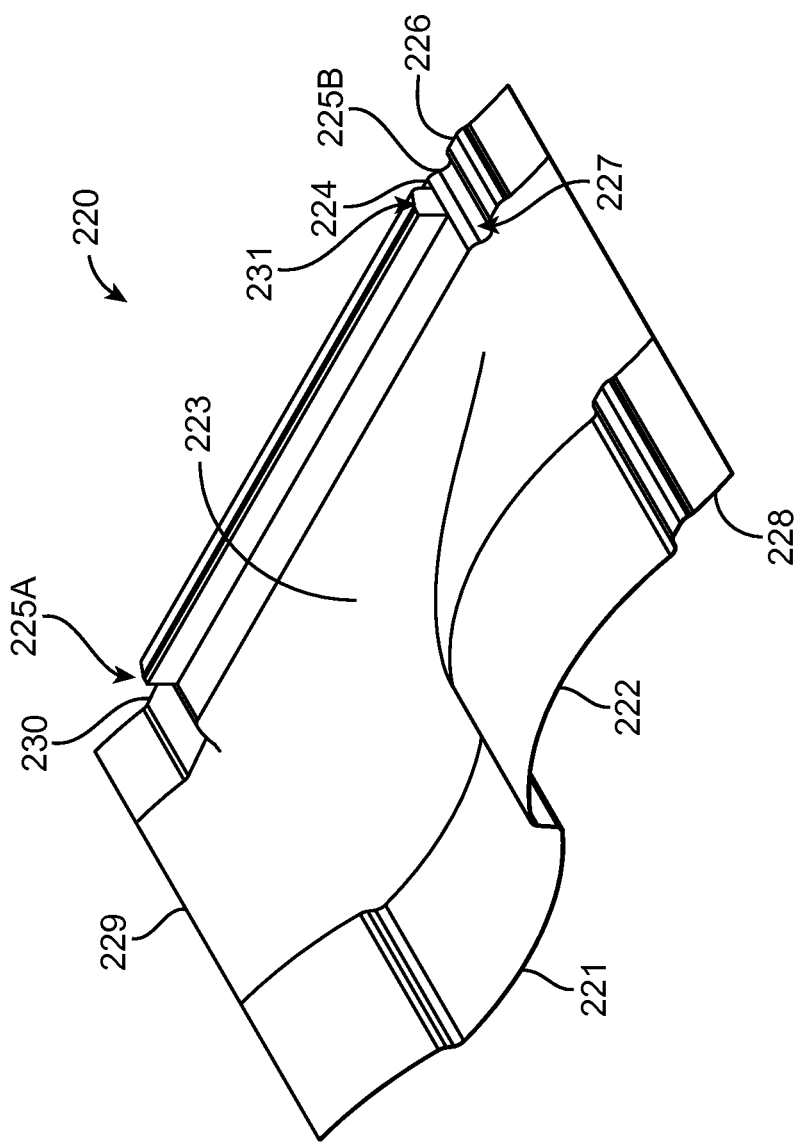
FIG. 3 is a perspective view of the lower flashing.

FIG. 3 is a perspective view of lower flashing 220. At one end, lower flashing 220 comprises a convex portion 221 and a concave portion 222. Together, portions 221 and 222 form an S-shaped first edge. At the opposite edge, an overlapping portion 224 is found. Overlapping portion 224 may optionally have two side walls 225A and 225B, a rise 226, a trough 227, a flange 228, and a horizontal panel 230. Transition portion 223 may rise, fall or slope to accommodate the dimensions of both edges of the flashing. Lower flashing 220 may be made of aluminum, steel, or other metals or other materials. It may be formed, molded, cast or otherwise formed.

Overlapping portion 224 further includes a seal 231. Seal 231 may be made of any suitable spongy material, including but not limited to, closed cell EPDM (ethylene propylene diene polymer) foam, and may be attached to overlap portion 224 by adhesives. In various embodiments, seal 231 may cover all or only a portion of overlapping portion 224. When the overlapping edge 104 of upper flashing 100 is placed on top of the overlapping edge 224 of lower flashing 220, seal 231 will push up against the bottom of overlapping portion 104. This will provide a seal in the aperture formed between the two flashings.

In various embodiments, seal 231 may extend upwardly from overlapping portion 224, or seal 231 may extend downwardly from overlapping portion 104, or seal 231 may extend upwardly from overlapping portion 224 and downwardly from overlapping portion 104. It is to be understood that in each of these embodiments, the sealing feature is of the present system simply comprises some form of seal between these two overlapping portions, regardless of how such seal is made. Thus, seal 231 may push against the bottom or top or sides of the portion of the tile hook 340 that passes through the aperture formed between the upper and lower flashings.

Figure 4:
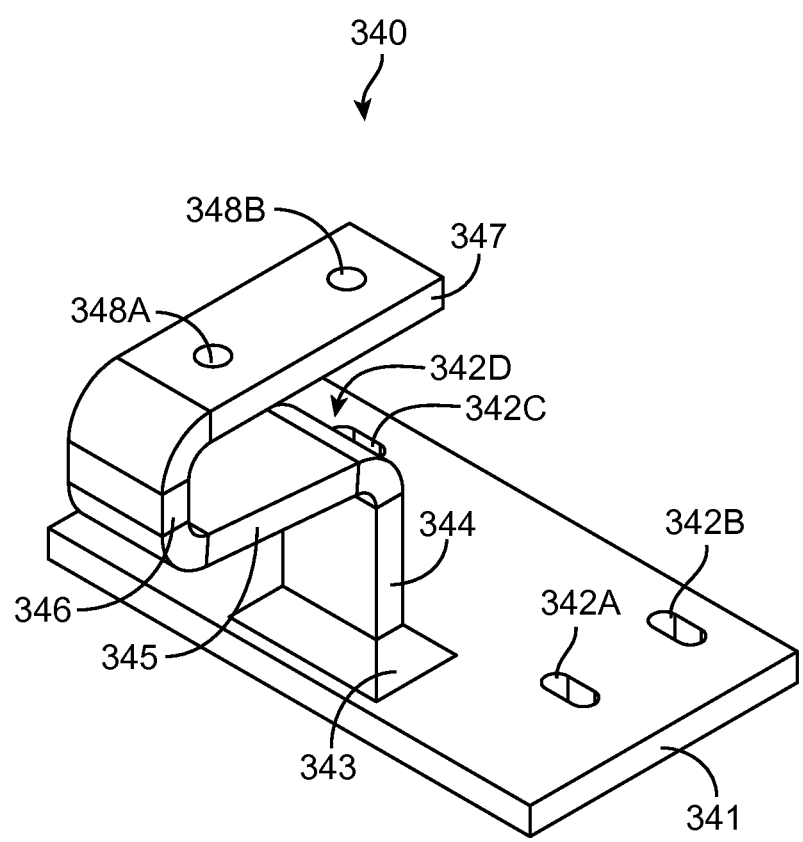
FIG. 4 is perspective view of the tile hook.

FIG. 4 is a perspective view of tile hook 340. Tile hook 340 includes a base portion 341 with apertures 342A-342C, an anchor portion 343, a vertical panel 344, an angled panel 345, a C-portion 346, and a horizontal panel 347 with apertures 348A-348B. Tile hook 340 may be aluminum, steel or other metal or material. Tile hook 340 may be forged, molded, cast or otherwise formed. Base portion 341 may be rectangular, circular, octagonal, or any other shape. Base apertures 342A-342D may be circular, lozenge-shaped, oblong, square, rectangular, or other shape and may be arranged to define the corners of a rectangle, or in any other arrangement. Fasteners (such as screws, not shown) pass through apertures 342A-342D to fasten to hook 340 to a building rafter. Anchor portion 343 may be a trapezoidal pyramid or any other shape. Anchor portion 343 may be positioned at any point on the upper surface of base portion 341. Upper apertures 348A-348B may be circular, lozenge-shaped, oblong, square, rectangular, or other shape and may be arranged centered lengthwise along horizontal panel 347, or in another arrangement.

Figure 5A:
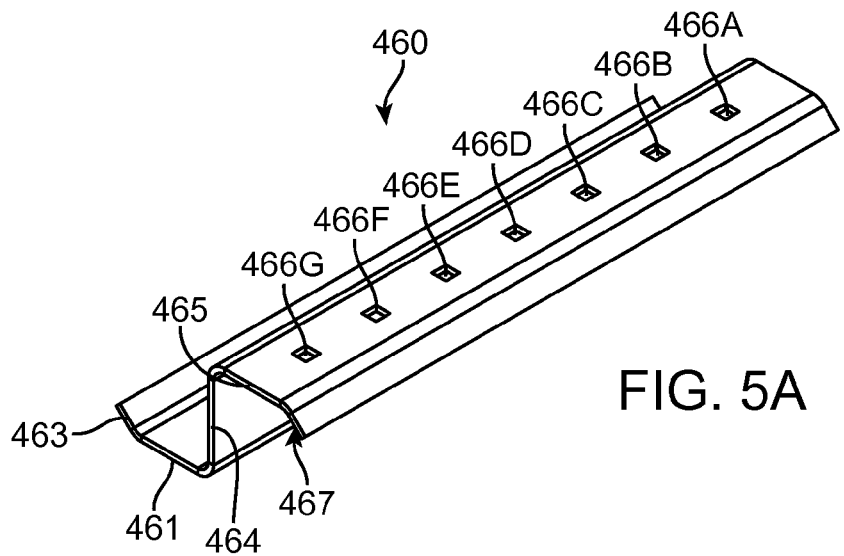
FIG. 5A is a perspective view of the top arm.
Figure 5B:
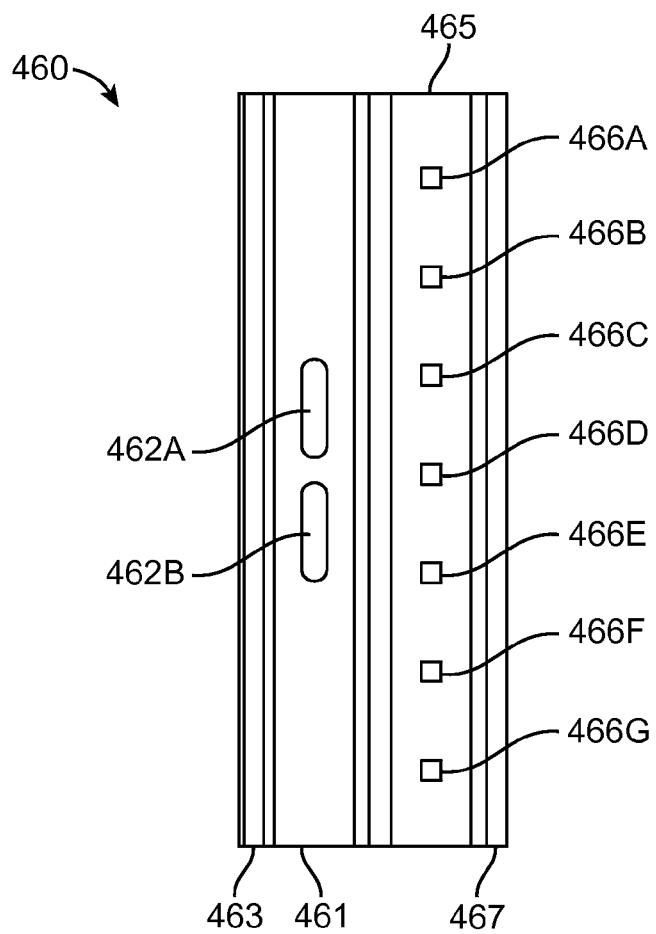
FIG. 5B is a top plan view of the top arm.

FIGS. 5A and 5B are views of top arm 460. Top arm 460 includes lower apertures 462A and 462B, lower flange 463, vertical panel 464, upper panel 465 with apertures 466A-466, and upper flange 467. Top arm 460 may be aluminum, steel or other metal or material. Top arm 460 may be forged, molded, cast or otherwise formed. Lower apertures 462A and 462B may be circular, lozenge-shaped, oblong, square, rectangular, or other shape and may be arranged centered lengthwise and depthwise on lower panel 461, or in another arrangement. Apertures 466A-466G may be circular, lozenge-shaped, oblong, square, rectangular, or other shape and may be arranged depthwise along upper panel 465, and distributed evenly, or in any other arrangement. In operation, top arm 460 may be connected onto the top of tile hook 340. Mounting hardware and components for the photovoltaic array may then be mounted onto the top of top arm 460. For example, a leveling foot (574 in FIG. 1C) may be attached onto the top of top arm 460.

FIGS. 6 to 8B show a second embodiment of the present invention. This second embodiment provides a flashing assembly, comprising: (a) a continuous flashing plate 680 having a flattened center section and two opposite curved end sections; (b) a puck 750 positioned below the flattened center section of flashing plate 680; and (c) an arm 811 on top of the flattened center section of flashing plate 680. As will be shown, arm 811 is connected to puck 750 with a connector (such as a screw, not shown) passing through the flattened center section of flashing plate 680.

Figure 6:
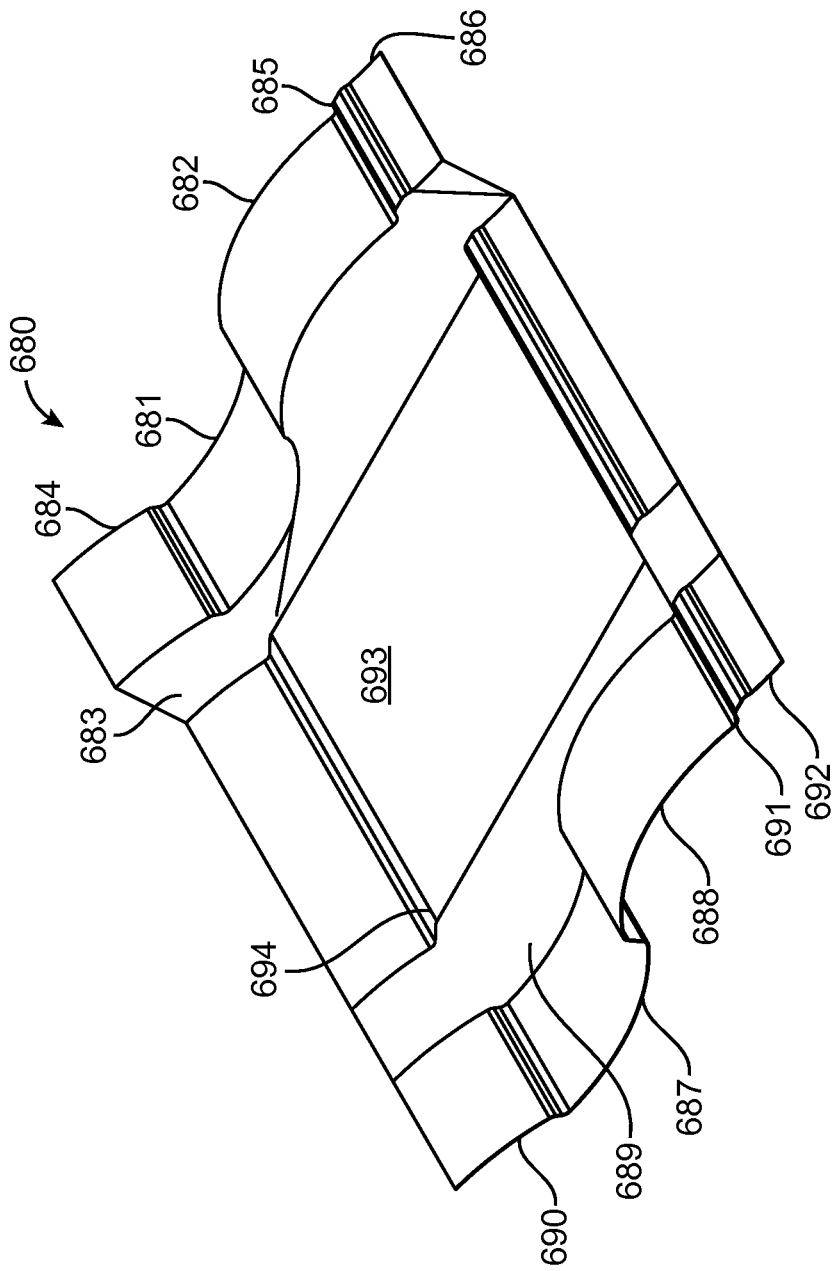
FIG. 6 is a perspective view of a continuous flashing according to an alternate embodiment of the invention.

FIG. 6 is a perspective view of a continuous flashing 680. Continuous flashing 680 may be used to replace a roof tile while interlocking with adjacent roof tiles, and permit another component (such as a top arm and/or leveling foot) to be mounted above the continuous flashing. Continuous flashing 680 has an upper convex portion 681, an upper concave portion 682, an upper arc 684, an upper rise 685, and an upper flange 686. At an opposite (lower) end, continuous flashing 680 has a lower convex portion 687, a lower concave portion 682, a lower arc 690, a lower rise 691, a lower flange 686. Continuous flashing 680 also has a relatively large central plane 693. Continuous flashing 680 may be made of aluminum, steel or other metal or material, and may be forged, cast, molded or otherwise formed. Central plane 693 may be rectangular, circular, square or other suitable shape.

Figure 7A:
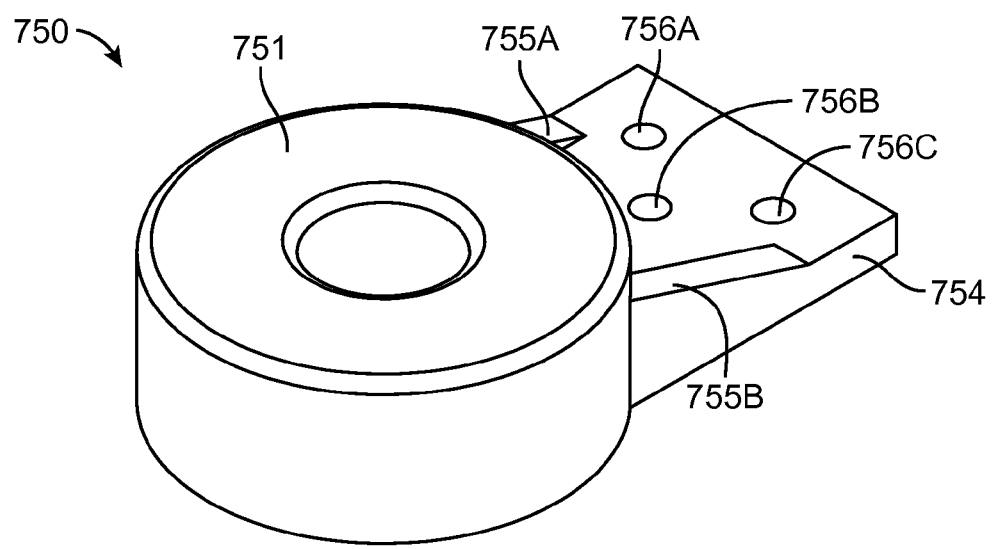
FIG. 7A is a perspective view of a puck for use with the continuous flashing of FIG. 6.
Figure 7B:
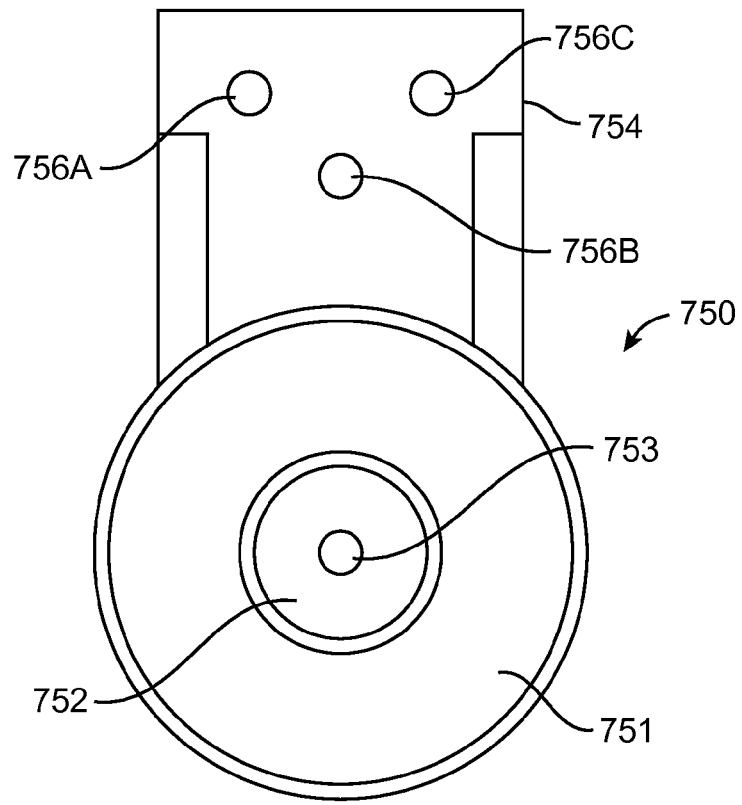
FIG. 7B is a top plan view corresponding to FIG. 7A.

FIGS. 7A and 7B are views of puck 750. Puck 750 optionally includes outer cylinder 751, inner cylinder 752, coupling aperture 753, flange 754, braces 755A and 755B, and flange apertures 756A-756C. Braces 755A and 755B may optionally be triangular in shape, and may optionally appear on either side of flange 754, or at other locations along flange 754. Flange apertures 756A-756C may be circular, lozenge-shaped, oblong, square, rectangular, or other shape, and may be arranged to define the corners of an isosceles triangle. Puck 750 may be made of aluminum, steel or other metal or material, and may be forged, cast, molded or otherwise formed.

Figure 8A:
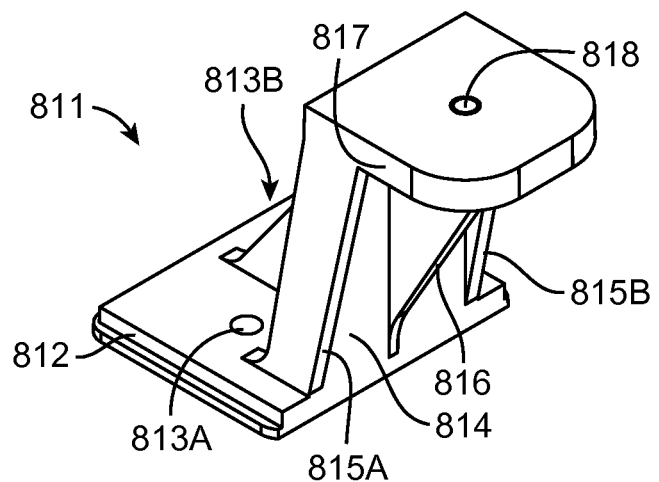
FIG. 8A is a perspective view of a top arm for use with the continuous flashing of FIG. 6 and the puck of FIGS. 7A and 7B.
Figure 8B:
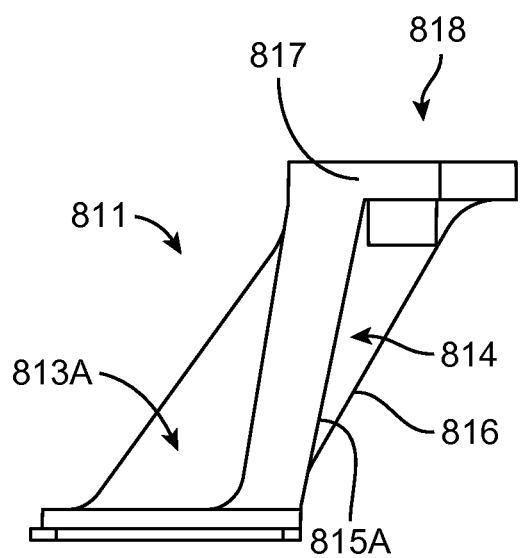
FIG. 8B is a side elevation view corresponding to FIG. 8A.

FIGS. 8A and 8B are views of arm 811. Arm 811 optionally includes a horizontal panel 812, lower apertures 813A and 813B, vertical panel 814, side supports 815A and 815B, center support 816, top panel 817 with top aperture 818. Lower apertures 813A and 813B may be circular, lozenge-shaped, oblong, square, rectangular, or other shape, and may be arranged linearly or in other arrangements. Vertical panel 814 may extend upwardly from horizontal panel 812. Side supports 815A and 815B may be on either side of vertical panel 814, as shown. Side supports 815A and 815B may originate at any point on horizontal panel 812 but preferably terminate at the rear most surface of top panel 817. Center support 816 may extend upward from horizontal panel 812 and may bisect or otherwise intersect vertical panel 814 such that center support 816 extends from the top surface of horizontal panel 812 to the bottom surface of top panel 817, as shown. Top panel 817 may extend forward from the top edge of vertical panel 814. Top aperture 818 may appear in the center of top panel 817 or other location on top panel 817. Arm 811 may be made of aluminum, steel or other metal or material, and may be forged, cast, molded or otherwise formed.

FIGS. 9A to 9C show sequential steps in the assembly of the second embodiment of the invention as shown in FIGS. 6 to 8B. (FIGS. 9A-1, FIG. 9B-1 and FIG. 9C-1 showing close-up view of the circled regions).

First, as seen in FIG. 9A, a roofing tile is removed and puck 750 is installed. Next, in FIG. 9B, a continuous flashing 680 is installed on top of puck 750, and arm 811 is installed on top of continuous flashing 680. Arm 811 may be connected to puck 750 using a screw passing through aperture 753, or by any other suitable method. This same fastening screw (not shown) will pass through the relatively large, flat center section 693 of flashing 680. Finally, as seen in FIG. 9C, a leveling foot 574 is installed on top of arm 811. Afterwards, a photovoltaic array can be anchored into position using the connection point provided by leveling foot 574.

The relatively large, flat central plane 693 of continuous flashing 680 permits an installer to locate puck 750 anywhere within its borders, thereby providing flexibility of installation location in both north/south and east/west directions. Similarly, arm 811 may be located at any point above the central plane of the flashing above puck 950. This permits the puck and arm to be located as close as possible to a photovoltaic module, thereby minimizing material use.

What is claimed is:

1. A tile hook and flashing assembly, comprising:
   (a) a lower flashing having a bottom end dimensioned to mate with a lower building tile, and be received over the lower building tile;
   (b) an upper flashing having a top end dimensioned to mate with an upper building tile, and be received under the upper building tile;
   (c) a tile hook, wherein a portion of the tile hook extends through an aperture passing between overlapping edges of the upper and lower flashings; and
   (d) a seal positioned within the aperture passing between the overlapping edges of the upper and lower flashings.

2. The assembly of claim 1, wherein the seal is made of closed cell EPDM foam.

3. The assembly of claim 1, wherein the portion of the tile hook that extends through the aperture extends above an overlapping portion of the lower flashing and below an overlapping portion of the upper flashing.

4. The assembly of claim 1, wherein a lower end of the tile hook is attached to a roofing membrane.

5. The assembly of claim 1, wherein the seal extends upwardly from the overlapping edge of the lower flashing and pushes against a bottom of the overlapping edge of the upper flashing.

6. The assembly of claim 5, wherein the seal pushes against a bottom of the portion of the tile hook that extends through the aperture.

7. The assembly of claim 6, wherein the seal wraps around the portion of the tile hook that extends through the aperture.

8. The assembly of claim 1, wherein the upper flashing and the lower flashing have an S-shaped edge.

9. The assembly of claim 8, wherein the S-shaped edges are at opposite ends from the overlapping edges of the upper and lower flashings.

10. The assembly of claim 1, further comprising:
   a top arm mounted onto a top end of the tile hook, the top arm being positioned above both the upper and lower flashings.

11. The assembly of claim 10, further comprising:
   a leveling foot mounted on top of the top arm.

* * * * *